(12) United States Patent
Hiscock

(10) Patent No.: US 9,747,439 B2
(45) Date of Patent: Aug. 29, 2017

(54) DYNAMIC NETWORK TUNER FOR THE AUTOMATED CORRELATION OF NETWORKING DEVICE FUNCTIONALITY AND NETWORK-RELATED PERFORMANCE

(75) Inventor: James S. Hiscock, Rockport, MA (US)

(73) Assignee: Trend Micro Incorporated, Tokyo (JP)

( * ) Notice: Subject to any disclaimer, the term of this patent is extended or adjusted under 35 U.S.C. 154(b) by 2941 days.

(21) Appl. No.: 11/347,893

(22) Filed: Feb. 6, 2006

(65) Prior Publication Data

US 2007/0192860 A1  Aug. 16, 2007

(51) Int. Cl.
*G06F 12/16* (2006.01)
*G06F 21/55* (2013.01)

(52) U.S. Cl.
CPC .................... *G06F 21/55* (2013.01)

(58) Field of Classification Search
CPC ....................................................... G06F 21/55
USPC ....................................................... 726/23–26
See application file for complete search history.

(56) References Cited

U.S. PATENT DOCUMENTS

| | | | | |
|---|---|---|---|---|
| 7,606,887 | B1* | 10/2009 | Stewart et al. | 709/223 |
| 2003/0225879 | A1* | 12/2003 | Chipchase | 709/224 |
| 2004/0034800 | A1* | 2/2004 | Singhal et al. | 713/201 |
| 2004/0093513 | A1 | 5/2004 | Cantrell et al. | 713/201 |
| 2005/0182847 | A1* | 8/2005 | Jawad Pirzada et al. | 709/233 |
| 2006/0173992 | A1* | 8/2006 | Weber et al. | 709/224 |

OTHER PUBLICATIONS

"ipAngel/X$^3$: Adaptive Vulnerability Shield"; http://www.lucidesecurity.com/ipAngel/13 (Lucid Security 2005).
"Core Elements of the Cisco Self-Defending Network Strategy", Cisco System White Paper (1995-2005).
"TippingPoint Intrusion Prevention System", TippingPoint Product Brochure (2005).

* cited by examiner

*Primary Examiner* — Farid Homayounmehr
*Assistant Examiner* — Suman Debnath
(74) *Attorney, Agent, or Firm* — Okamoto & Benedicto LLP

(57) ABSTRACT

A dynamic network tuner establishes fluid, continuous, and automatic correlation between the extent and/or degree of a networking device's functionality, on the one hand, and the network-related performance (i.e., network data traffic and/or network application performance), on the other. The dynamic network tuner can be embodied as a discrete device ready for installation into a host network. Preferably, such (and like) tuner embodiments are integrated into a network to automatically correlate, according to user-predefined parameters, the network's performance with the operation within the network of specifically-targeted, performance-altering networking devices, such as network security devices, or more preferably and particularly, intrusion prevention devices.

20 Claims, 1 Drawing Sheet

DYNAMIC NETWORK TUNER FOR THE AUTOMATED CORRELATION OF NETWORKING DEVICE FUNCTIONALITY AND NETWORK-RELATED PERFORMANCE

FIELD

In general, the present invention is directed to network tuning means, and particularly, a dynamic network tuner that automatically correlates networking device functionality with network-related performance.

BACKGROUND

The use by enterprises of network technology to transact business, commercial management, academic research, institutional governance, and like missions is vast, pervasive, and growing. Network technology—particularly digital packet-switched network technologies—now enables the extensive sharing and communication of information (e.g., technical, video, audio, and multimedia information), resources, and applications, within and beyond local and wide-area enterprise networks.

While packet-switched networks vary considerably in topology, size, and configuration, fundamentally such networks invariably comprise at least two nodes communicably-linked (via wired or wireless connections) to enable the transmission of digital packet-encapsulated data therebetween. Nodes—as known to those skilled in the art—includes desktop computers, laptop computers, work stations, user terminals, mainframe computers, servers, network attached storage, network printers, VoIP gateways, VoIP phones, and other destinations, origins, or termination points for said digital packet-encapsulated data.

Networking devices—sometimes referred to as "intermediate systems" or "interworking units"—are also commonly, if not invariably, present in packet-switched networks. These, in contrast to nodes, function principally to manage, regulate, shape, or otherwise mediate data traffic between network nodes. Switches, gateways, and routers, for example, direct packet traffic between nodes within a network, as well as traffic into and out of the network. Likewise, certain network security devices mediate packet traffic entering into or within a network, by filtering, isolating, tagging, and/or otherwise regulating data packets or data packet flows.

Supported by an escalating deployment of nodes and networking devices, "networking" of late has not only become "mission critical" for enterprises, but user-demand and the network traffic issuing therefrom are also increasing quite substantially. The transmission of data packets into, through, and out of current networks is escalating both in volume and in the complexity and unpredictability of the resulting traffic patterns. Although networking devices are specifically engineered to mediate data packet traffic efficiently throughout a network, their operating parameters are often held static and unresponsive to sudden changes in network traffic. Hence, if not checked constantly, the operation of networking devices under certain conditions—for example, unnecessarily lagging, delaying, or holding-up data traffic during periods of comparative network calm—can severely degrade efficient network-related performance.

The tension between network-related performance and networking device functionality is relevant quite notably in the deployment of certain advanced network security systems, particularly, modern "in-line" intrusion prevention systems. Such "in-line" systems are installed or otherwise implemented within the cores of enterprise networks. Although modern intrusion prevention systems are engineered to quickly, deeply, and thoroughly inspect packets and packet flows, due to their "in-line" installation within the heart of a network, any undue delays caused, for example, by intense data packet processing, could be felt undesirably throughout the entire network.

Clearly, for networking devices in general, and in particular, those high-functionality networking devices installed or installable at or close to a network's core, it is highly desirable to minimize the labor, skills, and frequency required to strike an acceptable balance between networking device functionality and overall network-related performance.

Today, commercial manufacturers for example configure their networking devices with a default set of operating parameters that, for most environments, would strike a reasonable balance. Unfortunately, different enterprise network environments present different applications, risks, and performance priorities, thus fostering a practice common among many network managers to manually tune the functionality of their networking devices (e.g., manually adjusting the filters and triggers of a network security device) to best meet network-related performance needs.

While manual tuning continues to be used, it is laborious and often imprecise. Need thus remains for alternative strategies for maintaining desirable network-related performance in the face of expanding and deepening networking infrastructure functionalities.

SUMMARY

In response to the aforementioned need, the present invention provides dynamic network tuning means that establishes fluid, continuous, and automatic correlation between the extent and/or degree of a networking device's functionality, on the one hand, and the network-related performance, on the other.

In a product aspect of the invention, the dynamic network tuning means is configured as a discrete tangible device ready for installation and use in a network, wherein said network comprises two or more nodes, a network-related performance monitor, and a networking device capable of executing a specified protocol or application that substantially effects data packet transmission within said network. The dynamic network tuning device itself comprises, housed within a common enclosure, (a) means for communicating with said network-related performance monitor; (b) means for communicating with said networking device; and (c) means for effecting a modification of said specified protocol or application.

In a system aspect of the present invention, the dynamic network tuning means is integrated into a network, such that the resultant dynamically-tuned network comprises: (a) two or more nodes communicably linked to enable transmission of data packets therebetween; (b) at least one networking device capable of executing a specified protocol or application effecting substantially said transmission of data packets; (c) a network-related performance monitor capable of monitoring at least one network-related performance parameter and thereby generating network-related performance information; and (d) a tuning agent capable of obtaining or receiving said network-related performance information from said network-related performance monitor and, in a substantially automatic predetermined response thereto, effecting a modification of said specified protocol or modification.

In light of the above, it is a principal object of the present invention to provide dynamic network tuning means for correlating networking device functionality and network-related performance, wherein said network-related performance includes, but is not limited to, network traffic flow performance and the performance of applications that execute over the network (i.e., "network application performance").

It is another object of the present invention to provide dynamic tuning means for automatically and fluidly correlating networking device functionality and network-related performance, wherein said dynamic network tuning means accomplishes said correlation, at least in part, by communicating with and providing instructions to said networking device based on network-related performance information obtained or received from a network-related performance monitor.

It is another object of the present invention to provide dynamic network tuning means for correlating a networking device's functionality and its effect on network-related performance, wherein said networking device is an in-line intrusion prevention system capable of executing a filter protocol from a filter protocol set upon detection by the intrusion prevention system of a real or potential network threat, and wherein said dynamic network tuning means accomplishes said correlation by affecting said filter protocol execution and/or said filter protocol set, based on network-related performance information obtained or received from a network-related performance monitor.

It is another object of the present invention to provide means for correlating a networking device's functionality with its effect on network-related performance, wherein said means is a discrete tangible device that combines both network-related performance monitoring functionality and dynamic network tuning functionality.

It is another object of the present invention to provide a dynamically-tuned network resultant of the integration into a network of dynamic network tuning means.

Other objects of the present invention will become apparent from the following detailed description taken in conjunction with the accompanying drawings.

DETAILED DESCRIPTION

The present invention seeks to broadly encompass all products and systems that employ or include dynamic network tuning means for correlating a networking device's function with the performance of the network hosting said networking device, as such technology is described herein. Particular types of network-related performance include, but are not limited to, network traffic flow performance and the performance of application(s) executed over the network (i.e., "network application performance").

Figure 1:
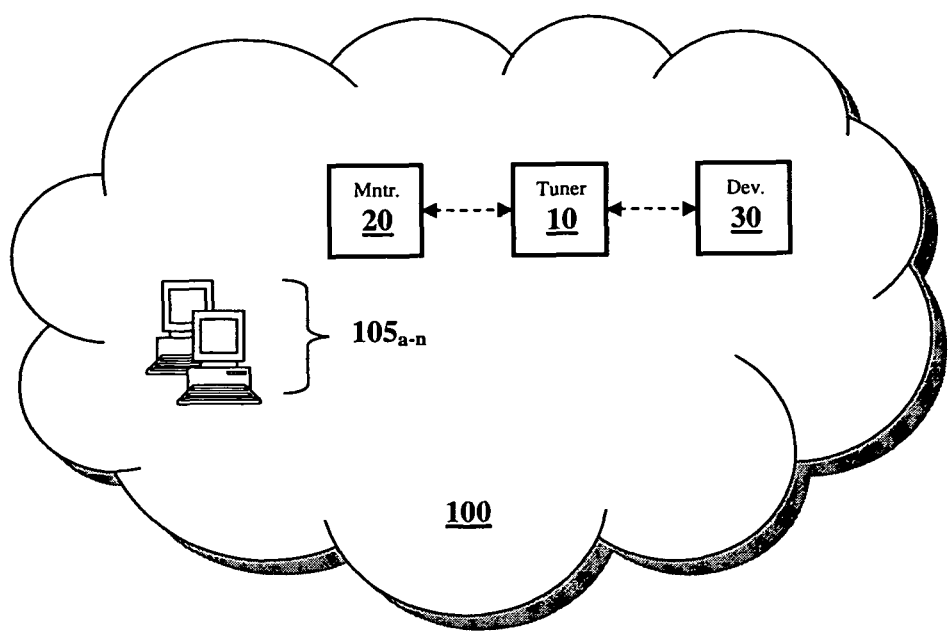
FIG. 1 is a logical diagram showing, within network 100, the functional relationship between a networking device 30, a dynamic network tuner 10, and a network-related performance monitor 20, as contemplated by the present invention.

In system embodiments, i.e., wherein the dynamic network tuning means are integrated into a network, the resultant network 100 will comprise—as shown in FIG. 1—certain principal components: Nodes 105a-n; networking device 30; network-related performance monitor 20, and a tuning agent 10.

The nodes 105a-n—of which there are two or more in number—are communicably linked to enable transmission of data packets therebetween.

The networking device component 30—of which there is at least one—can vary broadly in its specific functionality and physical configuration, but nonetheless can be defined as any networking device capable of executing a specified protocol or application that effects substantially the transmission of data packets between nodes 105a-n.

Likewise, the network-related performance monitor 20—subject also to broad variability—can be any device, component, subcomponent, program, utility, circuitry, or other means capable of monitoring at least one network-related performance parameter, and thereby, generating network-related performance information.

Finally, the tuning agent—also broadly variable—is defined herein in terms of its ability to obtain or receive the network-related performance information generated by the network-related performance monitor 20, and in a substantially automatic predetermined response thereto, effect a modification of the networking device 30's specified protocol or application, thus effecting network data packet transmission. In this manner, the tuning agent 10 provides, in conformity with the present invention, a means for dynamically correlating networking device functionality with network-related performance.

The present invention is not limited to any particular type, number, or topological deployment of networking devices. A host network can thus be configured with its networking device (or devices) mediating traffic within and beyond a discrete local area or a geographically-dispersed wide area, and/or two or more subnets (see e.g., FIG. 2) or no subnets. Examples of networking devices includes, but is not limited to, switches (e.g., routers, bridges, hubs, etc.), gateways, wireless access points, and network security devices (e.g., firewalls, intrusion detection systems, intrusion prevention systems, etc.).

As to switching device, several are commercially available from, for example, 3Com Corporation of Marlborough, Mass. (e.g., the "Superstak" family of switches); Cisco, Inc. of San Jose, Calif. (e.g., the "Catalyst" family of switches); Juniper Corporation of Sunnyvale, Calif. (e.g., the "E-", "J-", "T"-, and "M-" series of routing platforms); Enterasys Corporation of Andover, Mass. (e.g., the "Matrix" and "SecureStack" family of switches); D-Link Corporation of Taiwan (e.g., the XStack" family of switches); and Extreme Networks of Santa Clara, Calif. (e.g., the "Alpine" family of switches). As mentioned, regardless of type, the networking devices used in the present invention are those capable of executing a specified protocol or application that will substantially affect the transmission of data packets. An example, of such "protocol or application" in a switching device would be so-called CoS ("Cost of Service") and QoS ("Quality of Service") algorithms.

QoS algorithms, in particular, are implemented to specify a guaranteed throughput level. QoS enables capability within a network to define or assign better service to selected network traffic over various technologies, including Frame Relay, Asynchronous Transfer Mode (ATM), Ethernet and 802.1 networks, SONET, and IP-routed networks that may use any or all of these underlying technologies. The primary goal of QoS is to provide priority including dedicated bandwidth, controlled jitter and latency (required by some real-time and interactive traffic), and improved loss characteristics.

CoS algorithms, in particular, provide a method of differentiating the treatment received by specific traffic elements as they traverse a network. It tends to work on the basis of marking the traffic in some fashion and then using that marking to apply a specific forwarding treatment. This can include mechanisms such as queuing (higher priority queue for traffic marked with a high priority), scheduling, the path taken by the traffic, and so on.

Networking devices that implement CoS or QoS algorithms can be tuned, in practice of the present invention, by affecting any of a varieties of application and protocols involved therein. In particular, for example, the dynamic network tuner can be configured to dynamically set QoS or CoS parameters based on network-related performance information. QoS and CoS parameters are set by such devices for specified protocols or applications to assign relative priority of packets to meet performance goals of the protocols or applications. The tuning agent could measure the results of these QoS and/or CoS parameters on actual performance, so a network manager could specify the performance goals and the tuning system could adjust the QoS and/or CoS parameters until the performance goals are met.

Figure 2:
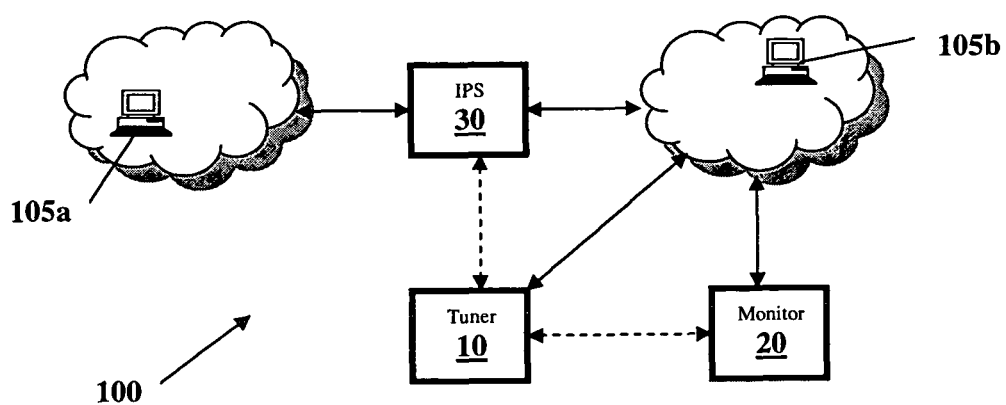
FIG. 2 is a schematic diagram of a particular embodiment of the present invention, wherein said embodiment provides a network 100 comprising nodes 105a and 105b, a networking device 30 (e.g., an intrusion prevention device), a network-related performance monitor 20, and a dynamic network tuner 10.

Attention is now directed to FIG. 2, wherein the networking device is specifically identified—in accordance with a preferred embodiment of the invention—as an intrusion prevention system 30.

The innovative association within a network 100 of dynamic tuning means with an intrusion prevention system device 30 shares the advantages obtained by the broader invention, as well as further enabling maintained acceptable network security, at levels of practicality and acceptability heretofore difficult, by an approach seemingly counterintuitive within the field of network security technology (cf., one that sometimes encourages comparatively lower threat detection sensitivity).

In the preferred embodiment, the intrusion prevention system 30 is defined in terms of its capability to execute a filter protocol from a filter protocol set upon detection by the intrusion prevention system of a real or potential network threat, wherein the execution of said filter protocol effects substantially the transmission of data packets between nodes 102a and 102n. As shown in FIG. 2, the intrusion prevention system 30—typically embodied as an in-line device—will be logically-positioned between nodes 102a and 102n, thereby capable of "seeing" all data packet transmission therebetween.

As in the broad embodiment of the invention, the network tuner 10 of the preferred embodiment obtains or receives network-related performance information from the network-related performance monitor 20. However, its "substantially automatic predetermined response" to such information is defined more specifically as leading to certain defined possibilities: i.e., affecting the systems' execution functionality; or affecting the system's detection functionality; or modifying the system's filter protocol set. The occurrence of each possibility will affect substantially network data packet transmission, hence dynamically correlating IPS functionality with network-related performance.

Several varieties of intrusion prevention systems are well described in the patent literature, for example, U.S. Pat. App. Pub. No. 2004/0151382, filed by G. S. Stellenberg and J. J. Aviles on Feb. 4, 2004, entitled "Method and Apparatus for Data Packet Pattern Matching"; U.S. Pat. App. Pub. No. 2003/0204632, filed by M. Willebeek-LeMair, C. Cantrell, D. Cox, J. McHale, and B. Smith on Apr. 30, 2002, entitled "Network Security System Integration"; U.S. Pat. App. Pub. No. 2003/0204728, filed by V. L. Irwin on Apr. 30, 2002, entitled "Steganographically Authenticated Packet Traffic"; U.S. Pat. App. Pub. No. 2004/0030776, filed by C. Cantrell, M. Willebeek-LeMair, D. Cox, D. Kolbly, and B. Smith on Aug. 12, 2002, entitled "Multi-Level Packet Screening with Dynamically Selected Filtering Criteria"; and U.S. Pat. App. Pub. No. 2004/0093513, filed by C. Cantrell, M. Willebeek-LeMair, D. Cox, J. McHale, B. Smith, and D. KoIbly on Nov. 7, 2002, entitled "Active Network Defense System and Method".

Intrusion prevention systems are also commercially available. For example several highly-efficient "in-line" intrusion prevention products are available from TippingPoint Technologies of Austin, Tex. (a division of 3Com Corporation) under the tradenames "TippingPoint X505", "TippingPoint 50", "TippingPoint 100E", "TrippingPoint 200", "TippingPoint 400", "TippingPoint 1200", "TippingPoint 2400", and "TippingPoint 5000E". Other intrusion prevention technologies encompassed include the Sentivist-IPS family of security products, sold by NFR Security or Rockville, Md.; the Cisco IPS 4200 Series Sensors, sold by Cisco, Inc. of San Jose, Calif.; and the TopLayer IPS 5500 series of IPS product, sold by TopLayer, Inc. of Westboro, Mass.

In a preferred embodiment, the intrusion prevention system is placed in-line with respect to the packet traffic flow was a part of the network infrastructure. In this configuration, inspection and manipulation of every passing packet is possible. Thus, as shown in FIG. 2, the networking device 30 (i.e., the IPS 30) in positioned in-line midstream between a subnetwork containing node 105A and node 105B, such that all data packets flowing between nodes 105A and 105B pass through IPS 30.

In particular, by sitting in-line and intercepting all packets, the IPS 30 can perform normalization by reassembling fragments using a set algorithm and forwarding reassembled packets. Normalizing the flow eliminates the need to project how a packet or flow will be handled on different target systems and thwarts popular detection evasion techniques.

In order for the intrusion prevention system 30 to perform in accordance with a preferred mode, it should be capable of performing stateful inspections of the packet traffic at line speeds and with low latency. For example, WAN/LAN access speeds are in the multi-gigabit range, and thus the intrusion prevention system should possess hardware capabilities in the gigabit rate with millisecond latencies typical of switches and routers. The goal here is deep pattern matching. The intrusion prevention system should possess a reliability measure that avoids discarding useful traffic. Also, because the intrusion prevention system 30 is implemented as part of the network infrastructure 100, it should be capable of delivering high availability.

A number of in-line functionalities are provided by the intrusion prevention system 30.

A first of such in-line functionalities comprises a state manager functionality for performing two key operations. First, the state manager implements a session management operation for monitoring and managing the state of each session relating to packet traffic being carried over the data flow. Second, the state manager implements a packet and flow reassembly operation that monitors the data flow with respect to established connections and examines plural packets, and their contents over time. Such operation is of particular advantage in the detection of unauthroized traffic flow hidden over several packets, which in themselves, appear benign.

A second of the in-line functionalities comprises a trigger filter functionality which implements a form of stateful pattern patching that facilitates deep packet inspection.

The trigger filter performs two filtering operation in connection with the active monitoring of the data flow. First, a packet header matching operation looks into each packet and determines whether the header field values therein give rise to suspicious or dangerous traffic. Second, a packet content matching operation looks into each packet and determines whether the content (character) strings and/or regular expression values therein give rise to a suspicion of dangerous traffic.

The trigger filter functionality is preferably implemented as an application customized piece of hardware in order to ensure its ability to perform the necessary task at maximum possible speed (preferably exceeding line speed for the data flow). More specifically, the process for fast path pattern matching is performed through the use of plural, hardware implemented, pattern matching components in a parallel processing architecture. This configuration allow the system to operate at line speeds and further provides for future scalability.

A third of the in-line functionalities provided by intrusion prevention system 30 comprises a packet handler functionality. The packet handler functionality operates, responsive to the evaluations and conclusions reached by the state manager functionality and trigger filter functionality, as a gatekeeper, and determines how the packets and/or sessions are to be handled. The packet handler functionality is preferably implemented in hardware in order to preserve its ability to act quickly in making the sorting decisions with respect to the passing packets in the data flow.

A fourth of the in-line functionalities provided by the intrusion preventions system 10 comprises a flow control functionality. The flow control functionality operate to shape the traffic flow output along the data path based on certain programmable or configurable priorities. Traffic shaping is primarily accomplished by regulating the rate at which certain packet traffic is allowed to pass along the data path. The flow control functionality is also preferably implemented in hardware in order to preserve its ability to act quickly in making the sorting decisions with respect to the passing packets in the data flow.

With respect to the packet traffic identified as suspicious and hen extracted from the data flow by the packet handler functionality, a more careful and thorough examination is made of that traffic before making a final handling decision.

The threat verification functionality operates in an analogous manner to the in-line trigger filter functionality. A primary operation difference, however, exists in connection with the level of detailed examination that is performed. Because the trigger functionality must operate in-line, the filtering criteria (or rules) must be designed for implementation at essentially line speed (preferably using a customized hardware solution). This design criteria essentially forces the trigger filter functionality to focus its detection efforts on a less through examination and evaluation that is designed to quickly identify suspicious and clearly dangerous or threatening packet traffic. The nature of this examination will inevitably identify as suspicious a certain amount of what could, with further more detailed analysis, be determined to be benign traffic. The goal of the "slow path" threat verification functionality, however, is to more thoroughly evaluate the suspicious traffic in order to separate out and return the benign portion of the suspicious traffic to the data flow. To that end, it can be advantageously implemented as a customizable software application in order to ensure its continued flexibility and ability to be tailored or tuned to a more through and careful evaluation or security risks.

In providing an intrusion prevention system, it is for certain applications desirable to implement a hierarchical approach to packet traffic screening. In this regard, a screening engine implements a multi-level processing technique. In a first level (also referred to as a triggering or detection level), a corresponding first filter receives packet traffic and screens that received traffic against a first set of filtering criteria. A portion of the received traffic that passes the first set of filtering criteria is output from the screening engine. A portion of the received traffic which does not pass the first set of filtering criteria, however, is forwarded on for further examination by a second level of the screening engine. The second level (also referred to as a confirmation or catch level) implements a corresponding second filter that receives the failing portion of the packet traffic and screens that received traffic against a second set of filtering criteria. A portion of the received traffic (failing portion) passes the second set of filtering criteria and is output from the screening engine to join the packet portion as the pass packet traffic output. A portion of the received traffic (failing portion) which does not pass the second set of filtering criteria, however, is then rejected. The rejected packets are then output and acted on as needed (for example, by logging, discarding, alert generation, and the like).

It will be understood that by including additional levels (above the second filter) an improvement in the accuracy of the system may be obtained while spreading the processing load out over more filters. However, these benefits are obtained at the expense of additional filtering operations and further possible delays in packet throughput.

In another mode of practice, the intrusion prevention system utilizes a pattern matching engine that supports high speed (up to at least 2.4. Gbits per second line rate speeds) parallel pattern matching in an unanchored fashion. The engine is preferably implemented as a hardware device.

In accordance with one embodiment of the pattern matching engine, a shift register serially receives a string of data stream bytes. The shift register partitions the string of data stream bytes into a plurality of multi-byte overlapping adjacent stream chunks (or sub-strings). Library patterns of bytes to be searched for are partitioned into multi-byte overlapping adjacent table chunks which are stored in a look-up table. The plurality of multi-byte overlapping adjacent stream chunks are then applied in parallel to the look-up table which stores the table chunks. Results of the parallel look-up operations are then logically combined to determine whether a portion of the data stream matches one of the patterns of bytes.

Pre-matching operations to characterize the data stream may also be performed. The results of the data stream characterization are then made available to assist the pattern matcher in reducing the field of library patterns under consideration.

An additional pre-matching operation may reassemble out of order packets within the data stream. Correctly ordered packets are thus made available to the pattern matcher to improve matching accuracy.

Yet another additional pre-matching operation may decode any encoded portions of the data stream. In this way, the library patterns need only be supplied in decoded format. As an enhancement, the library patterns may be supplied in both encoded and decoded format, with the pattern matching operation being performed with respect to both the encoded and decoded data stream portions.

Multiple look-up tables may be used to store overlapping adjacent table byte chunks for different classes of library patterns to be found. The different classes of library patterns may comprise different length patterns for each look-UP table. The different classes of library patterns may further comprise different traffic category patterns for each look-up table.

As mentioned, in the operation of the present invention, the network-related performance monitor 20 monitors at least one network-related performance parameter, and partially or completely on the basis thereof, generates network-related performance information. In particular, the network-related performance monitor should have the capability for passively or actively listening into, polling, auditing, evaluating, pinging, testing, modeling, accounting, or otherwise collecting, generating, and/or analyzing data, either globally from the network 100 and/or locally, from any or all of its components, with respect to such patent performance parameters as bit rates, latency, packet loss, application response time, CPU load, and other like indicia of network performance.

Once the network-related performance parameter(s) are obtained, the network-related performance monitor uses it to generate network-related performance information, which is essentially data that characterizes the state of network traffic and/or network application performance. The content and presentation of network-related performance information can vary in accordance with various embodiments of practicing the invention.

The network-related performance monitor 20 can work continuously or intermittently, for example, in accordance with a predetermined schedule. Monitoring and reporting can be accomplished either in so-called "real-time" or historically, for example, for trend analysis.

The network-related performance monitor 20, while a component of the present invention, need not be dedicated for use only for the present invention. Those skilled in the art will appreciate that, for example, in many enterprise-sized networks, monitors have been used in the past, of several and varied types, configurations, and capabilities. Such other capabilities include, for example, user interface or other user input means; a display, printer, or other output means; and advanced (oftentimes innovative) software for the collection, processing, and provision of network-related information at a depth and sophistication far beyond that needed for the present invention. While practitioners will obtain advantage by selecting or continuing to use such sophisticated monitors, the present inventions requires only that at least one performance parameter be monitored for the generation of network-related performance information.

The network-related performance monitor 20, in accordance with the present invention, also need not be a single-function type component, or for that matter, need not be dedicated stand-alone device. The dual functions of monitoring a performance parameter and generating performance information (i.e., "reporting") can be accomplished, for example, with software and/or electronic components integrated in or otherwise used in one or several of the invention's networking device components. For example, the network-related performance monitoring and/or reporting functionality of the present invention can be provided by in certain network routers, gateways, servers, and/or—as described herein—combined tuner/monitoring devices.

Further details regarding various network-related performance monitors 20, potentially deployable within the present invention, can be found both in the technical literature and in patent specifications. As to the latter, representative patent specifications of possible interest would include, for example, U.S. Pat. No. 5,446,680, issued to J. G. Sekiya et al. on Aug. 29, 1995; U.S. Pat. No. 6,058,102, issued to R. S. Drysdale et al. on May 2, 2000; U.S. Pat. No. 6,061,722, issued to W. J. Lipa on May 9, 2000; U.S. Pat. No. 6,067,113, issued to S. Ramanathan et al. on Jun. 13, 2000; U.S. Pat. No. 6,269,401, issued to R. A. Flethcer et al. on Jul. 13, 2001; U.S. Pat. No. 6,363,056, issued to M. S. M. Beigi et al. on Mar. 26, 2002; U.S. Pat. No. 6,810,246, issued to D. N. Kalofonous et al. on Oct. 26, 2004; U.S. Pat. No. 6,728,219, issued to P. P. Leong et al. on Apr. 27, 2004; U.S. Pat. No. 6,831,890, issued to P. Goldsack et al. on Dec. 14, 2004; and U.S. Pat. No. 6,678,245, issued to C. A. Cooper et al. on Jan. 13, 2004.

Network-related performance monitors, and/or components offering network-related performance monitoring and/or reporting functionality, are commercially-available from, for example, 3Com Corporation of Marlborough, Mass. (e.g., the 3COM "Network Supervisor", the 3COM "Network Director", the 3COM "Enterprise Management Suite", the 3COM "Network Administrator", etc.); Cisco Corporation of San Jose, Calif. (e.g., the CISCO "Netflow" product family, the CISCO "Network Analysis Module Software", the CISCO "IP Solutions Center" Products, the CISCO-WORKS "QOS Policy Manager", the CISCO "Network Assistant", etc.); Enterasys Corporation of Andover, Mass. (e.g., the ENTERASYS "NetSight" family of network management products); and Extreme Networks of Santa Clara, Calif. (e.g., the EXTREME NETWORKS "EPICenter" family of network management products). Other commercial suppliers and products, as known to those skilled in the art, are available for consideration.

In certain modes of practicing the present invention, performance measurement can be accomplished using either so-called "active agents" or "observation agents" implemented, for example, on client nodes, intelligent NICs, probes, IPS networking devices, switches, or server nodes. The response time measurements from either/both active and observational agents can be supplied to the dynamic network tuning means. The application performance monitor provides data to the tuning agent via MIB's such as ART (application response time) MIB or RFC 3728 APM (application performance management) MIB or a protocol designed for communication between the monitor and the tuning component of this system.

As know to those skilled in the art, active agents simulate a client and continuously issue "synthetic transactions" to servers, recording the elapsed time and success of those transactions. An advantage of employing an active agent within the present invention is that their operation can be controlled by the dynamic network tuning means, such that application performance can be measured during off-peak hours, as well as being able to run specified application on demand, thus enabling or otherwise promoting quicker tuning cycles. Although the "active agent"—measurements are intrinsically synthetic—i.e., representative, not actual—actual client activity can be recorded and used by the active agents to better model the actual traffic conditions of the network. As such, if active agents are employed, they should preferably be deployed near the edge of the network, so that network delays are better factored into the response time measurements.

One or more "observational agents", if desired, can be deployed in the path between the client nodes and the server nodes to measure the response time a server application is providing its clients. Observation agents—like active agents—can be deployed at the edge of the network to better capture network delay in its response time measurement. They also can be deployed both near the clients and near the servers to separate the network and server delay components. Information can be gathered from the clients and server ends to see the difference in response measurements to the same packet flow. The difference between these measurements can be used subsequently to identify the network delay components. Toward such end, the observational agents need assignment to perform deep packet inspection to identify and track application activity.

As stated hereinabove, the dynamic network tuning means 10 of the present invention can be any device, component, or integrated functionality that is capable of either obtaining or receiving network-related performance information from a network-related performance monitor 20 and, as a substantially automatic predetermined response thereto, tuning the operation of a targeted networking device 30.

In respect of the obtaining and receiving of network-related performance information, the particular functionality of the dynamic network tuner will depend largely on the functionality of the network-related performance monitor 20 and the means by which such monitor communicates performance information within the network. The communication of such information between the monitor 20 and the tuner 10 can be bilateral (e.g., when both are actively engaged in sharing data and information) or unilateral (e.g., when the tuner 10 passively collects information transmitted by the monitor 20); direct (e.g., when information flows directly between both) or indirect (e.g., when information flows through an intermediate component, such as a network server); and/or proximate (cf., a combined tuner/monitor device) or distant (e.g., when communicating between subnets of a WAN).

Once in possession of network-related performance information, the dynamic network tuner 10 communicates with the networking device 30 to affect the processing of packets flowing therethrough. The communication between the dynamic network tuner 10 and the networking device 30—like that between tuner 10 and monitor 20—can be bilateral or unilateral, direct or indirect, and/or proximate or distant.

The manner in which the networking device 30's packet processing operation(s) are effected will vary according to the configuration an character to the networking device 30. In general, however, where the networking device is defined as one capable of executing a specified protocol or application effecting substantially the transmission of data packets (i.e., within network 100), the dynamic network tuner 10 will effect a modification of said specified protocol or application. Thus, for example, in the invention's preferred embodiment, wherein the networking device is an intrusion prevention system 30, the tuner 10 will effect (e.g., amend, supplement, or otherwise modify) the any of IPS 30's particular filter protocols; or its threat detection sensitivity or functionality; or its set of filter protocols.

A basic tuning cycle, for example, can run continuously to dynamically react to changing operating conditions. All of the tuning decisions and reasons can be logged and made accessible to, for example, network managers and support personnel, to thereby enable external intervention into and management of tuning decisions and so that improvements can be made to the tuning process logic. More advanced tuning decisions can be made by reading network topology information and locating where in the topology applications are being used by clients; where servers running specific application are in the topology; where the networking devices are in the topology; and what data packet flows are processed by which networking device. With such topology information, the tuning system can eliminate networking device processing (i.e., networking device functionality) where not needed and expand it where advantageous. Also, if there are two or more networking devices in series, the processing load can be spread across the multiple devices.

In certain modes of practicing the present invention, if the desired performance or protection can not be reached with the devices deployed in the network, an appropriately-configured dynamic network tuner can be implemented to make suggestions to, for example, move networking devices to specific locations in the network for better data packet flow coverage; and/or add more networking devices to enable load sharing; and/or upgrade the network with higher performance networking devices.

In another mode of practicing the present invention, the dynamic network tuner can be configured to utilize the network-related performance monitor 20 as a feedback mechanism to tune, for example, other features of an IPS. One desirable IPS feature, for example, is to show the network bandwidth that each application is consuming, to thereby allow a network manager to allocate maximum bandwidth per application. Using the network-related performance monitor 20 as a feedback loop, a network manager—rather than specify bandwidth allocations speculatively towards certain desirable application performance objectives—could specify the application performance desired and the tuning agent could then adjust the bandwidth allocations accordingly to meet such specification. This would effectively reduce the degree of speculation often involved in assessing the effect of bandwidth restrictions to network-related performance, yielding more robust, predictable, and efficient network operation.

EXAMPLE

An intrusion prevention system, as described in U.S. Pat. App. Pub. No. 2004/0093513, is installed in-line within the core of a local area enterprise network, together with a dynamic network tuner and a network-related performance monitor, both configured and implemented in accordance with description hereinabove.

The basic inputs of the dynamic network tuner are the set of filter/triggers installed in the intrusion prevention system, the network-related performance information generated by the network-related performance monitor, and any user-defined preferred performance/protection balance parameters. The basic output flowing from such inputs are: a modified set of filters/triggers installable in the intrusion prevention system that meets the user-defined performance/protection balance.

The dynamically tuned network is further configured such that both the dynamic network tuner and the intrusion prevention system are able to download the latest set of filters/triggers that represent the known threats to network's security. The dynamic network tuner is further configured to enable the loading of a data structure defining the relationship of applications and the filter/triggers. (Such information can be learned through the lab and in field experience and may be used to "tune" or otherwise correlate the set of filters/triggers installed in the intrusion prevention system based upon the applications that are seen on the network or configured by the network manager.)

A basic tuning cycle for the dynamically tuned network is set as follows:

Step (1) Tuner initially sets no filter/trigger;
Step (2) Monitor baselines application that are running, then associate observed performance of each application;
Step (3) Tuner set the default set of filter/triggers;
Step (4) Monitor collects and communicates information relevant to whether applications are meeting desired performance/protection balance;
Step (5) Tuner adjusts filters/triggers; and
Step (6): Go to Step (4).

The user-definable parameters that determine the correlation between IPS functionality and network-related application performance are as follows:

Parameter (a) Application-Allowed "Slow Down" or "Minimum Performance Response Time", expressed respectively as a percentage or minimum allowed response time, per "each application" or per "all applications";

Parameter (b) "Acceptable Coverage Gap", expressed as a probability or percentage of known vulnerabilities nor covered, per "each application" or per "all applications";

Parameter (c) "Conflict Precedence" (Cf., If Parameter A cannot be met by Parameter B, the "Conflict Precedence" parameter specifies an automatic conflict resolution weighted to "performance", "coverage", or "compromise").

The dynamic network tuner is configured further with the following features:
a "Discover, Learn, and Tune" feature;
a "Hands-Off Full Auto" feature;
a "Bulk Deploy" feature; and
a "Remote Assistance" feature.

The "Discover, Learn, and Tune" feature provides a method for involving and educating network users. The method exposes to the user the application performance baseline, the coverage gap, and changes to applications performance resultant of certain filter/trigger sets.

The "Hands-Off Full Auto" feature enables a user to set small to zero network performance parameters and have the dynamic network tuner strike a desirable coberage/performance balance.

The "Bulk Deploy" feature enables a user observe the network either through the "Discover, Learn, and Tune" feature or "Hands-Off Full Auto" feature, then utilize environment specific information gained to bulk deploy several intrusion prevention devices. This is done such that the network can be tuned subsequently, if desired, using other tuner features.

The "Remote Assistance" feature—as the name implies—enables a user at a remote location to remotely tune the network.

As configured, the resultant dynamically-tuned, IPS-protected network is well-suited to provide broad network and network application functionality that is robustly, easily, accessibly, and comprehensively maintainable across dynamically changing network environments.

While only a few illustrative embodiments of the present invention have been discussed, it is understood that various modification will be apparent to those skilled in the art in view of the description herein. All such modifications are within the spirit and scope of the invention as encompassed by the following claims.

The invention claimed is:

1. A network comprising two or more nodes communicably linked to enable transmission of data packets there between, the network further comprising:
   an intrusion prevention system to execute a filter protocol from a filter protocol set on a data packet upon detection by the intrusion prevention system of a real or potential network threat, said execution of said filter protocol effecting substantially said transmission of data packets;
   a network-related performance monitor to monitor at least one network-related performance parameter and generating network-related performance information based upon the at least one network-related performance parameter;
   a tuning agent to obtain or receive said network-related performance information from said network-related performance monitor and based upon the network-related performance information, and in a substantially automatic predetermined response thereto, one of effecting said execution of said filter protocol and effecting a modification of said filter protocol set; and
   a processor to implement the tuning agent.

2. The network of claim 1, wherein said intrusion prevention system is installed inline with respect to said transmission of data packets to enable execution of said filter protocol on each said data packet passing therethrough.

3. The network of claim 2, wherein said detection by the said intrusion prevention system involves inspection of both payload and header information in each said data packet passing therethrough.

4. The network of claim 2, wherein the execution of said filter protocol involves classification of said data packets passing therethrough into good, bad, and suspicious packets.

5. The network of claim 3, wherein the execution of said filter protocol involves classification of said data packets passing therethrough into good, bad, and suspicious packets.

6. The network of claim 1, wherein the tuning agent comprises, housed within a common enclosure:
   means for communicating with said network-related performance monitor;
   means for communicating with said intrusion prevention system; and
   means for accomplishing said substantially automatic predetermined response.

7. The network of claim 6, wherein said network-related performance monitor is also housed within said common enclosure.

8. The network of claim 6, wherein said intrusion prevention system is also housed within said common enclosure.

9. A network comprising:
   two or more nodes communicably linked to enable transmission of data packets therebetween;
   at least one networking device for executing, on a data packet, a specified protocol or application effecting substantially said transmission of data packets upon detection by the at least one networking device of a real or potential network threat;
   a network-related performance monitor for monitoring at least one network-related performance parameter and generating network-related performance information based upon the at least one network-related performance parameter; and a tuning agent to obtain or receive said network-related performance information from said network-related performance monitor and based upon the network-related performance information indicating that the monitored at least one network-related performance parameter is to be tuned, and in a substantially automatic predetermined response thereto, effecting a modification of said specified protocol or application.

10. The network of claim 9, wherein the tuning agent comprises, housed within a common enclosure:
   means for communicating with said network-related performance monitor;
   means for communicating with said networking device; and
   means for accomplishing said substantially automatic predetermined response.

11. The network of claim 9, wherein said network-related performance monitor in also housed within said common enclosure.

12. A dynamic network tuner configured for installation and use in a network, wherein said network comprises two or more nodes, a network-related performance monitor, and a networking device for executing a specified protocol or application that substantially effects data packet transmission within said network, and wherein the dynamic network tuner comprises, housed within a common enclosure:
   a processor:
   a memory on which is stored machine readable instructions to cause the processor to:
      communicate with said network-related performance monitor to obtain or receive network-related performance information;
      communicate with said networking device; and
      effect a modification of said specified protocol or application based upon the network-related performance information indicating that the monitored network-related performance is to be tuned, wherein the networking device is to execute the specified protocol or application on a data packet upon detection by the networking device of a real or potential network threat.

13. The dynamic network tuner of claim 12, wherein said networking device is an in-line intrusion prevention system to execute a filter protocol from a filter protocol set upon detection by the intrusion prevention system of the real or potential network threat, said filter protocol being said specified protocol or application.

14. The dynamic network tuner of claim 13, wherein said detection by the said intrusion prevention system involves inspection of both payload and header information in each said data packet passing therethrough.

15. The dynamic network tuner of claim 13, wherein the execution of said filter protocol involves classification of said data packets passing therethrough into good, bad, and suspicious packets.

16. A dynamic network tuner and monitor configured for installation and use in a network, said network comprising two or more nodes and at least one networking device for executing a specified protocol or application that substantially effects data packet transmission within said network, the dynamic network tuner and monitor comprising, housed within a common enclosure:
   a network-related performance monitor to monitor at least one network-related performance parameter and generate network-related performance information based upon the at least one network-related performance parameter;
   a tuning agent to effect a modification of said specified protocol or application based upon said at least one network-related performance information indicating that the monitored at least one network-related performance parameter is to be tuned, wherein the at least one networking device is to execute the specified protocol or application on a data packet upon detection by the at least one networking device of a real or potential network threat; and
   a processor to implement the tuning agent.

17. The dynamic network tuner and monitor of claim 16, wherein said networking device is an in-line intrusion prevention system to execute a filter protocol from a filter protocol set upon detection by the intrusion prevention system of a real or potential network threat, said filter protocol being said specified protocol or application.

18. The dynamic network tuner and monitor of claim 17, wherein said detection by the said intrusion prevention system involves inspection of both payload and header information in each said data packet passing therethrough.

19. The dynamic network tuner and monitor of claim 17, wherein the execution of said filter protocol involves classification of said data packets passing therethrough into good, bad, and suspicious packets.

20. The network of claim 1, wherein one of effecting said execution of said filter protocol, said detection by the intrusion prevention system, and effecting a modification to said filter protocol set is to correlate operation of the intrusion prevention system with the at least one network-related performance parameter.

* * * * *